Figure 1:
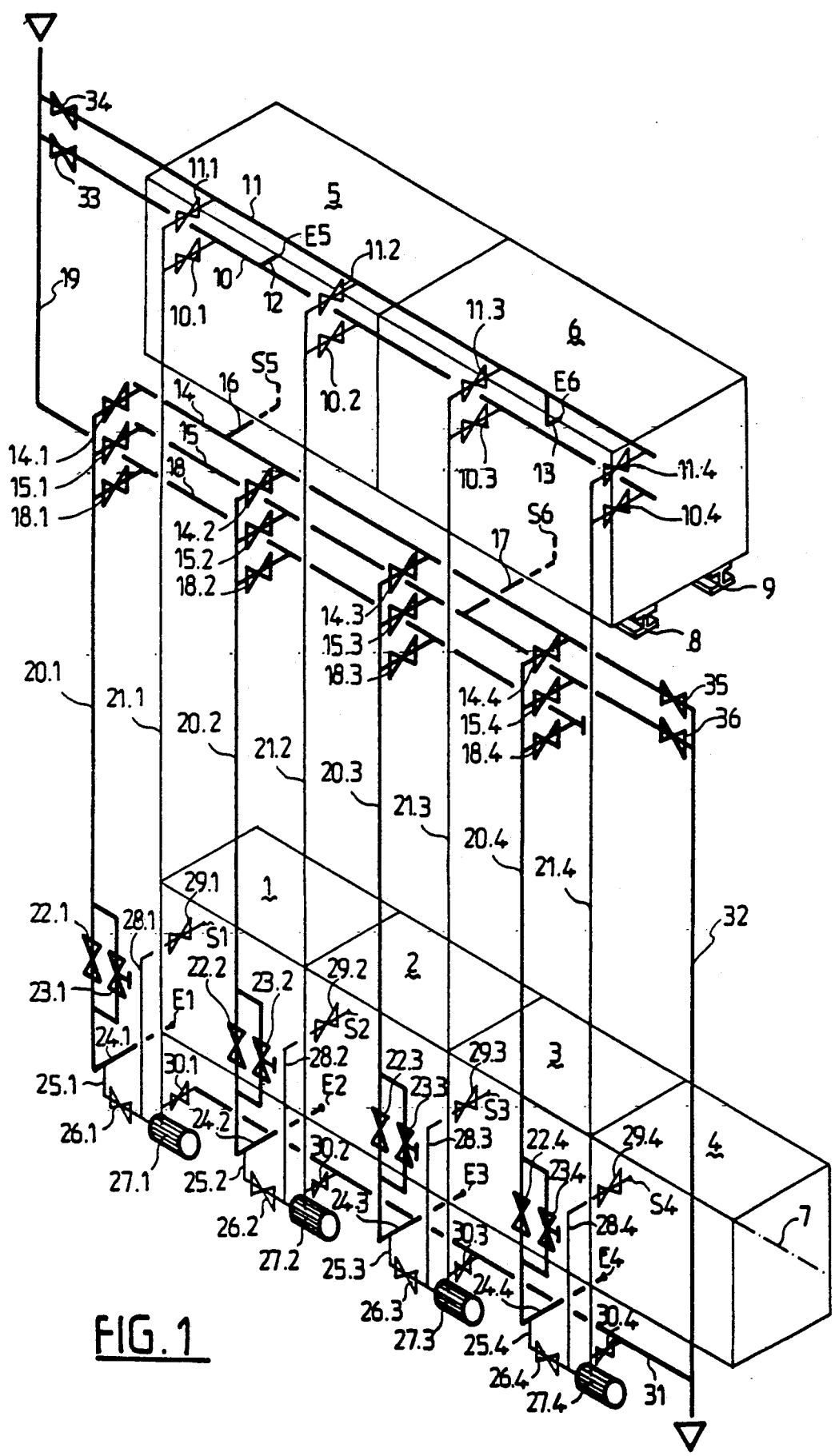

United States Patent [19]

Drêano

[11] Patent Number: 5,005,471

[45] Date of Patent: Apr. 9, 1991

[54] COOKING MACHINE

[75] Inventor: Claude Drêano, Guilliers, France

[73] Assignee: Armor-Inox SA, France

[21] Appl. No.: 323,482

[22] Filed: Mar. 14, 1989

[30] Foreign Application Priority Data

Mar. 23, 1988 [FR] France ............... 88 04133

[51] Int. Cl.$^5$ ........................................ A47J 27/20
[52] U.S. Cl. ........................................ 99/330; 99/355; 99/367; 99/448; 99/470
[58] Field of Search ........... 99/325, 330, 352, 353, 99/355, 402, 403, 416, 359, 367–370, 470, 483; 426/506, 509, 520, 523, 524; 165/61, 48.1

[56] References Cited

U.S. PATENT DOCUMENTS

| | | | |
|---|---|---|---|
| 1,485,133 | 2/1924 | White | 99/330 |
| 1,927,043 | 9/1933 | Mullen | 99/330 |
| 2,638,838 | 5/1953 | Talmey et al. | 99/355 |
| 3,511,169 | 5/1970 | Fritzberg et al. | |
| 3,796,144 | 3/1974 | Foldenauer et al. | 99/441 |
| 3,971,306 | 7/1976 | Wiese et al. | 99/353 |
| 3,983,259 | 9/1976 | Maior | 99/368 |
| 4,088,444 | 5/1978 | Byrne | 99/370 |
| 4,173,993 | 11/1979 | Skala . | |
| 4,270,598 | 6/1981 | Britton . | |
| 4,505,192 | 3/1985 | Dreano | 99/367 |
| 4,873,917 | 10/1989 | Sugimura et al. | 99/443 C |

FOREIGN PATENT DOCUMENTS 0070228 1/1983 European Pat. Off. .

Primary Examiner—Timothy F. Simone
Attorney, Agent, or Firm—Laff, Whitesel, Conte & Saret

[57] ABSTRACT

A machine for heating, packaged or non-packaged foodstuffs. It comprises a plurality of cooking tanks (1 to 4), a central heater for hot liquid (5), a central chilling plant for cold liquid (6) and an assemblage of liquid distribution pipes and liquid conveyor pipes.

The main heating tank (5) and cooling tank (6) are located at a height clearly above the cooking tanks (1 to 4) and associated with each is a distribution pipe (14 or 15) connected to its exit (S5 or S6) and a collecting pipe (10 or 11) connected to its exit (E5 or E6). Each cooking tank (1) is provided with a descending pipe (20.1) connected to each distribution pipe (14 or 15) via an electric valve (14.1 or 15.1) and with an ascending pipe (21.1) connected to each collecting pipe (10 to 11) via an electric valve (10.1 or 11.1). A flow control valve (23.1) is located in series on the descending pipe (20.1) which is connected to the entry (E1) of the said cooking tank (1), the overflow of which (S1) is connected the entry of a pump (27.1) via an electric valve (29.1), the entry which is similarly connected to the entry of the said cooking tank via, an electric valve (26.1), and the exit of which is connected to the ascending pipe (21.1).

5 Claims, 2 Drawing Sheets

COOKING MACHINE

The present invention concerns a cooking machine for packaged and non-packaged food by immersion in a hot liquid, followed by cooling by immersion in one or more cold liquids. Specifically, the invention concerns a machine comprising a plurality of cooking tanks, a heating plant for hot liquid, a refrigeration plant for cold liquids and an assemblage of pipes for distributing the liquids.

It is known that a machine of this type is described in the document EP-A-70 228. In this machine the feed pipe, in which a pump is fitted, joined in parallel to the tanks. On each parallel branch of the feed pipe, is provided an electric valve. A return pipe, in which a pump is fitted, is connected in parallel to the tanks. On each parallel branch of the return pipe, is located an electric valve. In a variation, there are, on each tank, two parallel branches connected to the return pipe, one is connected to the overflow of the tank and the other to the drainage outlet, each branch is provided with an electric valve. In practice, in this machine, only one pump is used on the return pipe as this makes more complicated the programming of the contral circuit which, because of the cooking characteristics of the different products, switches the electric valves on and off.

An object of the present invention consists of providing a machine in which the cooking in the different tanks can be totally programmed independently from each other.

Another object of the invention comprises providing a more compact machine.

According to one characteristic of the invention there is provided a cooking machine comprising a plurality of cooking tanks, a heating plant for hot liquid, a refrigeration plant for cold liquid and an assemblage of liquid distribution pipes and liquid transporting pipes, the heating and refrigeration plants being located at a height distinctly higher than that of the cooking tanks and each being linked with a distribution duct system connected to its exit, and at its entry to a collecting duct system, each cooking tank being provided with a descending pipe connected to each distribution pipe via a first electric valve and with an ascending pipe connected to each collecting pipe via a second electric valve, a flow control valve being located in series in the descending pipe which is connected to the entry of the said cooking tank, the overflow of which is connected via a third electric valve to the entry of a pump, the entry of which is similarly connected to the entry of the said cooking tank by, a fourth electric valve, and the exit of which is connected to the ascending pipe.

According to another characteristic of the invention, in parallel on each flow control valve is located a fifth high volume flow valve.

According to another characteristic, the machine is furnished with a third distribution duct system which is connected firstly to a mains water supply duct and secondly to each descending pipe via a sixth electric valve, and with a drainage duct system which is connected, firstly, to a drainage sump and, secondly, to the exit of each pump via a seventh electric valve.

Figure 3:
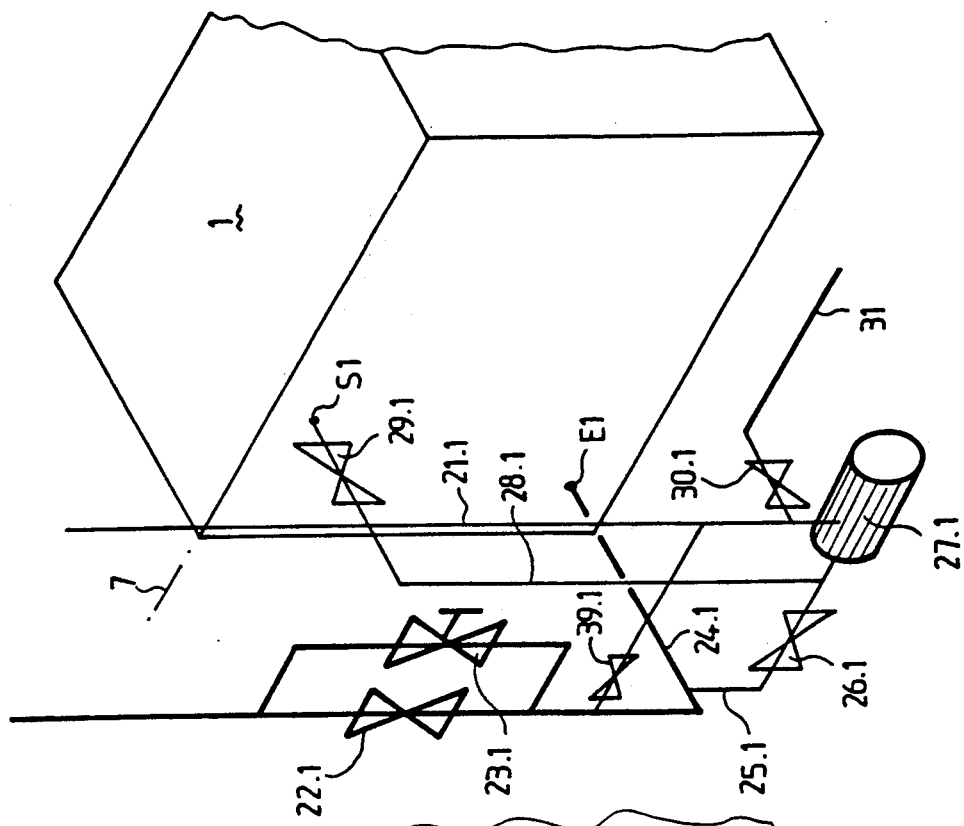
Figure 2:
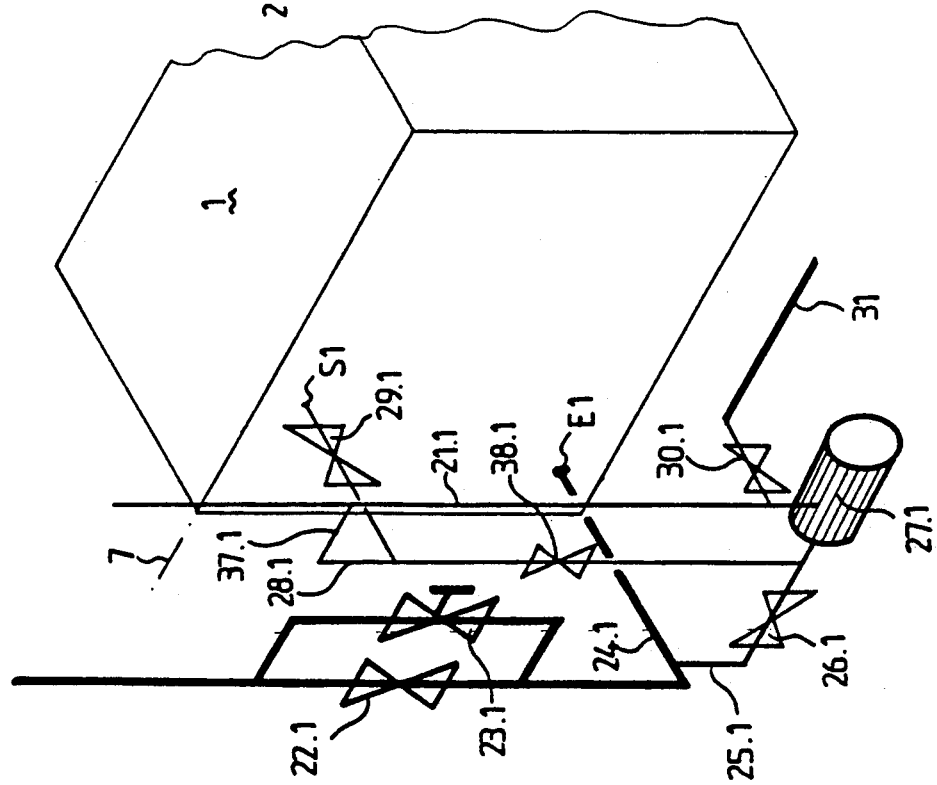

The characteristics of the aforementioned invention together with others, will become more apparent in the following description embodying specific examples, the said description will be made with reference to the accompanying drawings, wherein:

FIG. 1 is a schematic view in perspective of a machine according to the invention; and FIGS. 2 and 3 are schematic views in perspective of variations of a part of the assemblage of pipes of the machine shown in FIG. 1.

The machine shown in FIG. 1 comprises four cooking tanks 1 to 4, a heating plant 5, a refrigeration plant 6 and an assemblage of pipes, the component parts of which will be described in detail in the following.

The four tanks 1 to 4 are, in the example shown, of parallelepiped form and are located in line. The upper face of each cooking tank is a hinged lid, the axis of the hinges of the lids being in the same plane as the line 7 which corresponds, substantially, to the rear edge of the upper faces of the tanks.

The main tanks 5 and 6, which in the example shown, are also of parallelepiped form, and are mounted on a structure, of which two girders 8 and 9 are shown. In practice the girders 8 and 9 are situated several meters above the tanks 1 to 4, in a manner which allows sufficient space for a lifting device, such as a pulley block from which is hung a group of baskets to be lowered into a tank of which the lid is raised, or to be lifted out of a tank once the cooking is completed. The whole assemblage of pipes is located at the rear of the tanks 1 to 4, between the latter and the central tanks 5 and 6, thus making all the space in front of the tanks available for the manipulation of the lifting device or devices and for the operators.

Behind the upper part of the main tanks 5 and 6 there are provided, one above the other, two collecting pipes which run horizontally and longitudinally 10 and 11. By definition, in the following, one designates as longitudinal, all horizontal directions parallel to the rear faces of tanks 1 to 4 and as transverse, all horizontal directions perpendicular to these rear faces. The longitudinal pipe 10 is connected, by a transverse segment 12, to the entry E5 of the heating plant 5. The longitudinal pipe 11, situated in the same vertical plane above the pipe 10, is connected, by a bend 13, to the entry E6 of the refrigeration plant 6.

Behind the lower base of the main tanks 5 and 6, are respectively provided, one above the other, two longitudinal distribution pipes 14 and 15. The pipe 14 is connected by a bend 16, to the exit S5 of the heating plant 5. The pipe 15 is connected, by a bend 17, to the exit S6 of the refrigeration plant 6. The pipes 14 and 15 are in the same vertical plane. Underneath the pipe 15 in the same vertical plane, is another longitudinal delivery pipe 18. The pipe 18 is connected to a vertical pipe 19 which is joined to the local mains water supply.

The pipes 14, 15 and 18 are connected, in parallel, to four vertical descending pipes 20.1 to 20.4 by four groups each with three electric valves 14.1, 15.1, 18.1; 14.2, 15.2, 18.2; 14.4, 15.4 and 18.4. Thus, each of the electric valves is identified by a first number indicating the exit pipe 14, 15 or 18 and a second number corresponding to the row of the electric valves is identified in the same fashion as the above.

In series on the lower part of each vertical pipe 20.1 to 20.4, is an electric valve 22.1 to 22.4. In parallel on each electric valve 22.1 to 22.4 is a flow control valve 23.1 to 23.4. The lower end of each pipe 20.1 to 20.4 is connected by a transverse segment 24.1 to 24.4 to the entry E1 to E4 of the corresponding tank 1 to 4. Each of the entries E1 to E4 is situated towards the lower left side of the corresponding tank 1 to 4.

Each segment 24.1 to 24.4 is connected respectively to a vertical branch 25.1 to 25.4 the free end of which is connected to the entry of an electric valve 26.1 to 26.4, the exit of which is connected the entry of a pump 27.1 to 27.4. The orientation of the axes of the electric valve 26.1 to 26.4 and of the pumps 27.1 to 27.4 are all longitudinal.

The entry of each pump 27.1 to 27.4 is similarly connected to the exit S1 to S4 of the corresponding tank 1 to 4, by the intermediary of a vertical segment 28.1 to 28.4 and an electric valve with transverse axis 29.1 to 29.4. The exits S1 to S4 are the overflows which are located in the upper part of tanks 1 to 4, not so far to the left as the entries E1 to E4.

The exit of each pump 27.1 to 27.4 is connected directly to the lower end of the corresponding pipe 21.1 to 21.4. The lower part of each pipe 21.1 to 21.4 is also connected by an electronic valve with transverse axis 30.1 to 30.4 to a longitudinal pipe 31, which itself is connected to an evacuation pipe 32.

Each pipe 10 or 11 is closed at one end at its other end is connected to a supply pipe 19 via an electric valve 33 or 34. Each pipe 14 and 15 is closed at one end and its other end is connected to the evacuation pipe 32 via an electric valve 35 or 36.

There will now be a description of how the machine just described functions, assuming at the outset that the main heating tank 5 and main cooling tank 6 are full and operational. When vacuum packaged foodstuffs have been placed in tank 1, for example, one opens the electric valves 14.1 and 22.1 such that hot water descends by gravity, by 16, 14, 14.1, 20.1, 22.1, 24.1 and E1 into the tank 1. The electric valves 29.1 and 10.1 are closed. When the level of water in tank 1 has reached the maximum level, above that of the overflow S1, the corresponding level detector causes electric valve 14.1 to close and the filling phase is complete.

Each cooking tank 1 to 5 is furnished with a high water level detector, a low water level detector and a temperature probe, which are not shown. The main tanks 5 and 6 are also provided with a means for regulating the temperature. Finally the machine is furnished with a control unit for the electric valves and pumps which acting on information received from the detectors and the probes, the whole preferably being controlled by a microprocessor.

If the temperature at a specific point in tank 1 is less than the designated temperature, the temperature designation detector, not shown, causes electric valves 29.1, 10.1 and 14.1 to be opened, electric valves 22.1 to be closed and the pump 27.1 to become operational. The water flows through S1, 29.1 and 28.1 to enter the pump 27.1 which conveys it by 21.1 and 10.1 to the central heating tank 5. This is the circulatory phase. The water of tank 1, still too cold, is returned to the main tank 5 which supplies hot water. As the electric valve 22.1 is closed, the valve 23.1 limits the flow so that the articles being cooked are not displaced by excessive turbulence. In these two phases of operation, it is assumed that the electric valves 26.1 and 30.1 are closed. In contrast the valves 23.1 for which a selectively low rate of flow is adapted is open. After some time, the temperature of the water in the tank reaches the designated temperature, the respective pump is then stopped and the electric valves 14.1 and 29.1 are closed. As described in document EP-A-70-228, cooking can possibly comprise a plurality of circulatory phases.

Once the cooking is finished, the electric valves 14.1, 22.1, 29.1 are closed and the electric valves 26.1 and 10.1 are opened and the pump 27.1 becomes operational. The water in the tank runs off via S1, 24.1, 26.1 and the pump returns it to the main heating tank 5 via 21.1 and 10.1. Once the minimum level of water in the tank is attained, which is detected by a level detector, not shown, the pump is stopped and the electric valve 26.1 is again closed. The hot water emptying phase is ended.

One then opens the electric valves 18.1 and 22.1 for filling tank 1 with mains water, at 14° or 15° C. for example. This is the replenishing phase. Once the maximum level is reached in the tank, the respective detector causes the electric valves 29.1, 30.1 to open, the electric valve 22.1 to close and the pump 27.1 to become operational, the electric valve 26.1 being closed. The mains water flows slowly into the tank, at the flow rate governed by valve 23.1 and runs off via the drainage pipe 31. This phase of circulation continues so long as the temperature in the tank 1 has not dropped below a predetermined designated temperature. Once this occurs the electric valves 18.1 and 29.1 are closed and the electric valve 26.1 is opened. The pump then empties the mains water from the tank via the pipe 31.

Once the tank is empty, which is detected by the minimum level detector, one then opens electric valves 15.1 and 22.1 after having closed electric valves 26.1, 29.1 and 30.1 and one stops pump 27.1. The tank 1 is filled with chilled water, at 5° for example, provided by main tank 6. When the maximum level is reached in tank 1, the circulatory phase begins, as in the cooking situation, but electric valve 11.1 is opened instead of electric valve 10.1. The emptying of the refrigerated water from the tank is preferred as above, but by opening electric valve 11.1.

All the closures and openings of the electric valves and the starting and stopping of the pumps are controlled by an electronic command unit, governed by a microprocessor, on the basis of the measurements taken in the tanks and data associated with the products and the amounts to be cooked. The filling and the emptying of the main tanks 5 and 6 is obvious by activation of the electric valves 33 to 36.

FIG. 2 represents a variation of the machine which provides a means of internal circulation in a cooking tank, for example to obtain in a heating phase between two phases of circulation, a high standard of constancy of temperature regardless of altitude. In this variation, the pipe 28.1 is extended upwards beyond the level of the electric valve 29.1 and, at its upper end is connected, by a longitudinal segment 37.1, to the pipe 21.1. Furthermore, an electric valve 38.1 is fitted in series on the pipe 28.1 upstream of the entry of the pump 27.1. As the electric valves 38.1 and 10.1 are closed and the electric valves 29.1 and 26.1 open, operation of the pump 27.1 enables water to be circulated via 21.1, 37.1, 28.1, 29.1, S1, tank 1, E1 and 26.1.

FIG. 3 represents another variation of the machine which also provides a means of internal circulation in a cooking tank. In this second variation, between the output of the pump 27.1, i.e. the lower portion of the pipe 28.1, and the tank input E1 of the tank 1, i.e. the lower portion of the pipe 20.1, there is provided an electric valve 39.1. As the electric valves 10.1, 11.1 and 26.1 are closed and the electric valves 29.1 and 39.1 open, operation of the pump 27.1 enables water to be circulated via 21.1, 39.1, 24.1, E1, tank 1, S1, 29.1 and 28.1.

In the variations shown in FIGS. 2 and 3, the tank 1 has been considered by way of example, but obviously the same variations also apply on any tank of the machine.

The function which has been described relates especially to vacuum packaged products. In the instance of products packaged in an inert gas, the tanks may be provided with a means for pressurising. They must then be constructed as autoclaves.

What is claimed is:

1. A machine for cooking food, said machine comprising a plurality of cooking tanks on a lower level, a central source of hot liquid on a higher level, a central source of cold liquids on a higher level, a format of pipes for delivering both said hot and said cold liquids between said sources and said cooking tanks, said format of pipes comprising a first distribution pipe extending from an entrance to said source of hot liquid to a first plurality of valves, a second distribution pipe extending from an entrance to said source of cold liquid to a second plurality of valves, a third distribution pipe extending from an exit of said source of hot liquids to a third plurality of valves, a fourth distribution pipe extending from an exit of said source of cold liquids to a fourth plurality of valves, a plurality of ascending pipes, each of said ascending pipes extending from an individually associated valve in said first and second plurality of valves to an individually associated one of said cooking tanks, a plurality of descending pipes, each of said descending pipes extending from an individually associated valve in said third and fourth plurality of valves to an individually associated one of said cooking tanks, flow control valve means in each of said descending pipes for controlling a flow of said liquids into said individually associated cooking tanks, a plurality of pumps, there being one pump associated with each of said cooking tanks, a fifth plurality of valves individually coupled in pipes which are individually associated with said cooking tanks and which extend from said cooking tanks to inlets of individually associated ones of said pumps, and a connection from an outlet of each of said pumps to an individually associated one of said ascending pipes, each of said valves being a controllable electric valve.

2. A machine according to claim 1, characterized in that a high volume valve is coupled in parallel with each of said flow control valves.

3. A machine according to claim 2, characterized in that the machine has a fifth distribution pipe which is connected, firstly, to a main water supply pipe and, secondly, to each descending pipe via a sixth individually associated electric valve, and by an emptying pipe connected, firstly to a drainage sump and, secondly to the outlet of each of said pumps via a seventh individually associated electric valve.

4. A machine according to claim 3, and means for circulating liquid within each of said cooking tanks.

5. A machine according to any one of the claims 1 or 2 or 3, and means for pressurizing each of said cooking tanks.

* * * * *